(12) United States Patent
Okubo et al.

(10) Patent No.: US 10,105,683 B2
(45) Date of Patent: Oct. 23, 2018

(54) POROUS MEMBER AND CATALYST MEMBER

(71) Applicant: SUMITOMO ELECTRIC INDUSTRIES, LTD., Osaka-shi, Osaka (JP)

(72) Inventors: Soichiro Okubo, Osaka (JP); Takeshi Hikata, Osaka (JP); Risa Utsunomiya, Kyoto (JP); Teruaki Matsuba, Kyoto (JP); Hitoshi Matsumoto, Kyoto (JP); Yugo Higashi, Kyoto (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 334 days.

(21) Appl. No.: 14/767,077

(22) PCT Filed: Feb. 20, 2014

(86) PCT No.: PCT/JP2014/054038
§ 371 (c)(1),
(2) Date: Aug. 11, 2015

(87) PCT Pub. No.: WO2014/129545
PCT Pub. Date: Aug. 28, 2014

(65) Prior Publication Data
US 2015/0375210 A1 Dec. 31, 2015

(30) Foreign Application Priority Data

Feb. 22, 2013 (JP) ................................. 2013-033306
Dec. 25, 2013 (JP) ................................. 2013-267520

(51) Int. Cl.
*B01J 21/18* (2006.01)
*B01J 23/38* (2006.01)
(Continued)

(52) U.S. Cl.
CPC ........... *B01J 23/755* (2013.01); *B01J 21/185* (2013.01); *B01J 23/20* (2013.01); *B01J 23/34* (2013.01);
(Continued)

(58) Field of Classification Search
CPC ... B01J 21/18; B01J 23/20; B01J 23/34; B01J 23/38; B01J 23/54; B01J 23/74; B01J 23/76; B01J 35/0006; C01B 32/15
(Continued)

(56) References Cited

U.S. PATENT DOCUMENTS 3,023,490 A * 3/1962 Dawson ............... B23D 61/028
428/556
3,425,875 A * 2/1969 Pond ....................... H01M 4/86
502/101
(Continued)

FOREIGN PATENT DOCUMENTS

CN 1946635 A 4/2007
CN 101120468 2/2008
(Continued)

OTHER PUBLICATIONS

Chinese Office Action issued by the Chinese Patent Office dated Nov. 1, 2017 in a counterpart foreign application with attached English-language translation.

*Primary Examiner* — Patricia L. Hailey
(74) *Attorney, Agent, or Firm* — Drinker Biddle & Reath LLP

(57) ABSTRACT

A porous member includes a base member and carbon nanostructures. The base member includes a porous body having a porosity of more than or equal to 80%. The carbon nanostructures are formed on a surface of the base member, (Continued)

and have a width of less than or equal to 100 nm. A catalyst member includes a catalyst arranged on surfaces of the carbon nano structures.

9 Claims, 12 Drawing Sheets

(51) Int. Cl.

| | | |
|---|---|---|
| *B01J 23/76* | (2006.01) | |
| *B01J 23/755* | (2006.01) | |
| *B01J 37/02* | (2006.01) | |
| *B01J 23/20* | (2006.01) | |
| *B01J 23/34* | (2006.01) | |
| *C01B 32/05* | (2017.01) | |
| *C01B 32/15* | (2017.01) | |
| *B01J 35/00* | (2006.01) | |
| *B01J 37/34* | (2006.01) | |
| *B01J 23/24* | (2006.01) | |
| *B01J 23/48* | (2006.01) | |
| *B01J 23/56* | (2006.01) | |
| *B01J 23/74* | (2006.01) | |

(52) U.S. Cl.
CPC ........... *B01J 37/0238* (2013.01); *C01B 32/05* (2017.08); *C01B 32/15* (2017.08); *B01J 23/24* (2013.01); *B01J 23/48* (2013.01); *B01J 23/56* (2013.01); *B01J 23/74* (2013.01); *B01J 35/0033* (2013.01); *B01J 37/349* (2013.01)

(58) Field of Classification Search
USPC ................ 502/182, 185; 428/548, 550, 613; 977/700, 755, 773, 963
See application file for complete search history.

(56) References Cited

U.S. PATENT DOCUMENTS

| | | | | |
|---|---|---|---|---|
| 5,037,791 A | * | 8/1991 | Comolli | B01J 21/18 208/217 |
| 5,488,023 A | * | 1/1996 | Gadkaree | B01J 21/18 502/182 |
| 5,597,665 A | | 1/1997 | Harada et al. | |
| 5,998,328 A | * | 12/1999 | Dawes | B01J 21/18 502/180 |
| 7,112,237 B2 | * | 9/2006 | Zeller | B01D 39/2034 210/490 |
| 8,906,571 B2 | * | 12/2014 | Sato | H01M 8/0206 429/457 |
| 2006/0257641 A1 | * | 11/2006 | Cho | H01M 4/8605 428/307.3 |
| 2007/0224107 A1 | | 9/2007 | Hikata | |
| 2007/0249493 A1 | | 10/2007 | Kawata et al. | |
| 2008/0274392 A1 | | 11/2008 | Hori et al. | |
| 2009/0136808 A1 | * | 5/2009 | Kang | B01J 21/18 429/532 |
| 2010/0261058 A1 | * | 10/2010 | Lopatin | H01M 4/133 429/212 |
| 2010/0297428 A1 | | 11/2010 | Pham-Huu et al. | |
| 2011/0003174 A1 | | 1/2011 | Hikata et al. | |
| 2012/0329643 A1 | * | 12/2012 | Ogawa | B01J 21/063 502/182 |

FOREIGN PATENT DOCUMENTS

| | | | | |
|---|---|---|---|---|
| CN | 102026918 A | | 4/2011 | |
| JP | 08-170126 A | | 7/1996 | |
| JP | 2006-305422 A | | 11/2006 | |
| JP | 2007-126338 A | | 5/2007 | |
| JP | 2007-290913 A | | 11/2007 | |
| JP | 2008-198469 A | | 8/2008 | |
| JP | 2009-138252 A | | 6/2009 | |
| JP | 2010-526009 A | | 7/2010 | |
| JP | 4528192 B2 | | 8/2010 | |
| JP | 2010-274174 | * | 12/2010 | ............ B01D 71/02 |
| JP | 2013-060609 A | | 4/2013 | |
| KR | 2008-0039227 | * | 5/2008 | ............ B82B 3/00 |
| TW | 429164 B | | 4/2001 | |

* cited by examiner

POROUS MEMBER AND CATALYST MEMBER

TECHNICAL FIELD

The present invention relates to a porous member and a catalyst member, and more particularly to a porous member having an increased surface area per unit volume and a catalyst member using carbon nanostructures.

BACKGROUND ART

Conventionally, metal porous bodies made of metal such as nickel and an aluminum have been known (see Japanese Patent Laying-Open Nos. 8-170126 and 2013-60609). Further, as an application example of such a metal porous body, an electrode for generating plasma having carbon nanostructures formed on a surface of a metal porous body has been proposed (see Japanese Patent Laying-Open No. 2008-198469). Japanese Patent Laying-Open No. 2008-198469 describes that the carbon nanostructures are irregularly aligned on the surface of the metal porous body in order to implement an electrode capable of emitting electrons in multiple directions to generate plasma substantially uniformly with respect to an electrode substrate.

Further, conventionally, catalyst members having a catalyst metal such as platinum arranged on surfaces of carbon nanostructures such as carbon nanotubes have been known (see, for example, Japanese Patent Laying-Open No. 2007-126338). Japanese Patent Laying-Open No. 2007-126338 discloses arranging metal fine particles acting as a catalyst on the surfaces of the carbon nanostructures.

CITATION LIST

Patent Document

PTD 1: Japanese Patent Laying-Open No. 8-170126
PTD 2: Japanese Patent Laying-Open No. 2013-60609
PTD 3: Japanese Patent Laying-Open No. 2008-198469
PTD 4: Japanese Patent Laying-Open No. 2007-126338

SUMMARY OF INVENTION

Technical Problem

Japanese Patent Laying-Open Nos. 8-170126 and 2013-60609 do not particularly describe a method for further increasing the surface area of the metal porous body. Further, Japanese Patent Laying-Open No. 2008-198469 does not particularly describe applying the metal porous body to other applications which requires a large surface area, such as a filter and an electrode of a secondary battery. In addition, Japanese Patent Laying-Open No. 2008-198469 neither discloses nor suggests an optimum configuration of the metal porous body when it is used for such an application, and the like.

Moreover, in the catalyst member described above, it is required to increase the density of the catalyst per unit volume, from the viewpoint of improving performance of the catalyst member (for example, efficiency of a catalytic reaction). Japanese Patent Laying-Open No. 2007-126338 discloses improving performance of the catalyst member by improving a surface condition of the carbon nanostructures and enhancing the ability of supporting the metal fine particles. However, further improvement in performance is desired for the catalyst member.

One object of the present invention is to provide a porous member having an increased surface area which can be applied to various applications such as a filter and an electrode of a secondary battery.

Another object of the present invention is to provide a catalyst member which can have an improved performance as compared to conventional catalyst members.

Solution to Problem

A porous member in accordance with the present invention includes a base member and carbon nanostructures. The base member includes a porous body having a porosity of more than or equal to 80%. The carbon nanostructures are formed on a surface of the base member, and have a width of less than or equal to 100 nm.

A catalyst member in accordance with the present invention includes a base member made of a porous body, carbon nanostructures formed on a surface of the base member, and a catalyst arranged on surfaces of the carbon nanostructures.

With such a structure, since a plurality of pores (for example, fine pores) are present in the surface of the base member made of the porous body, the surface area per unit volume of the base member is significantly larger than that of a common bulk body. Accordingly, the number of the carbon nanostructures formed per unit volume of the base member can also be increased, as compared to a case where the carbon nanostructures are formed on a surface of the mere bulk body. Therefore, when the catalyst arranged on the surfaces of the carbon nanostructures has a constant density, the density of the catalyst per unit volume of the catalyst member can be increased. As a result, a high performance catalyst member capable of causing a catalytic reaction with a high density can be implemented.

Advantageous Effects of Invention

According to the present invention, a porous member having an increased surface area which can be applied to various applications can be provided. In addition, a catalyst member which exhibits a high performance can be obtained.

DESCRIPTION OF EMBODIMENTS

Figure 1:
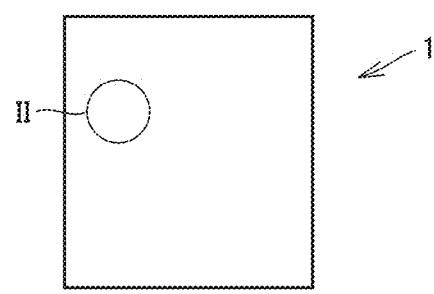
FIG. 1 is a schematic view showing a porous member in accordance with the present embodiment.

Description of Embodiments of Invention of Present Application

Hereinafter, embodiments of the present invention will be described with reference to the drawings. It is noted that identical or corresponding parts in the drawings described below will be designated by the same reference numerals, and the description thereof will not be repeated.

First Embodiment

A porous member 1 in accordance with the first embodiment includes a base member 5 and carbon nanostructures (10, 20). Base member 5 includes a porous body having a porosity of more than or equal to 80%. The carbon nanostructures (10, 20) are formed on a surface of base member 5, and have a width of less than or equal to 100 nm.

With such a structure, the surface area of the porous member can be significantly increased by using the porous body having a porosity of more than or equal to 80% as base member 5, and forming the carbon nanostructures having a width of less than or equal to 100 nm on the surface of base member 5. Thus, excellent properties can be obtained by applying the porous member to applications such as a filter, a catalyst, or an electrode of a battery. Further, ventilation resistance in porous member 1 can be reduced sufficiently by setting the porosity of the base member to more than or equal to 80%, and pressure loss of a fluid to be treated (for example, gas) can be suppressed by applying porous member 1 to a filter or a catalyst (for example, a catalyst member having a catalyst arranged on surfaces of carbon nanostructures).

It is noted that the porosity (%) herein is defined as (1−(apparent specific gravity of the porous body)/(true specific gravity of a material constituting the porous body))× 100. The higher the rate of fine pores in the base member, the higher the value of the porosity.

In porous member 1 described above, a plurality of fine pores may be formed in the surface of base member 5. In base member 5, the carbon nanostructures (10, 20) may be formed from the surface to side walls of the fine pores located inside the surface. In this case, the area of a region in which the carbon nanostructures (10, 20) are formed is increased, and as a result, the surface area of porous member 1 can be further increased.

In porous member 1 described above, a material constituting base member 5 may include metal. In this case, a sufficiently high strength can be obtained for porous member 1. Further, by using metal, which is a conductor, as the material for base member 5, electric current can be passed through porous member 1, and thus porous member 1 can be easily applied to an application such as an electrode of a secondary battery.

In porous member 1 described above, the material constituting base member 5 may include ceramics. In this case, the heatproof temperature of porous member 1 can be increased as compared to a case where a common metal is used as base member 5. Accordingly, when porous member 1 is applied for example to a catalyst or the like, the temperature of using the catalyst can be set to a sufficiently high temperature region.

In porous member 1 described above, pressure loss when porous member 1 has a thickness of 10 mm and a measured wind pressure is 2 m/s may be less than or equal to 1000 Pa. In this case, the pressure loss (ventilation resistance) of porous member 1 is in a sufficiently low state, and thus pressure loss when a fluid such as a gas is caused to flow through porous member 1 can be maintained sufficiently low.

Details of Embodiment of Invention of Present Application (Structure of Porous Member)

Referring to FIGS. 1 to 5, porous member 1 as an embodiment of the present invention will be described. For porous member 1, any shape such as a flat plate shape, a columnar shape, or a tubular shape can be adopted.

Figure 2:
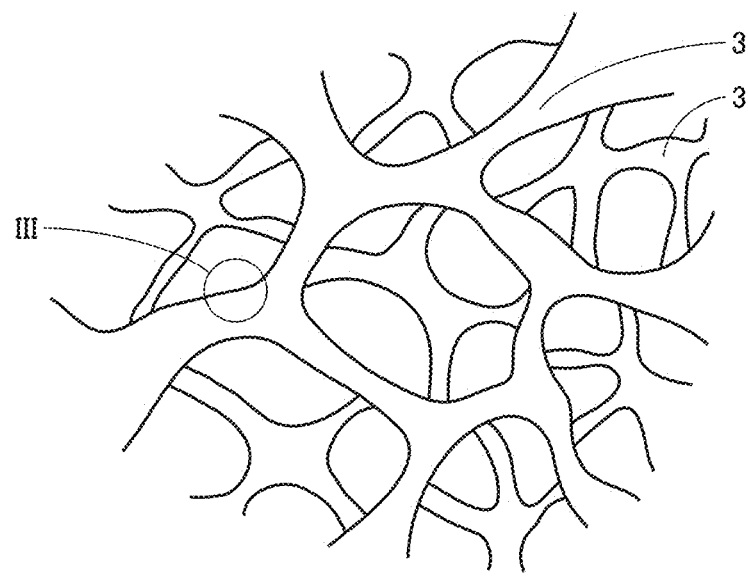
FIG. 2 is an enlarged schematic view showing a region II in FIG. 1.
Figure 3:
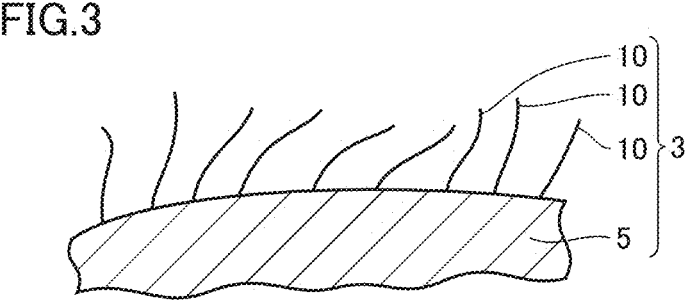
FIG. 3 is an enlarged schematic view showing a region III in FIG. 2.
Figure 4:
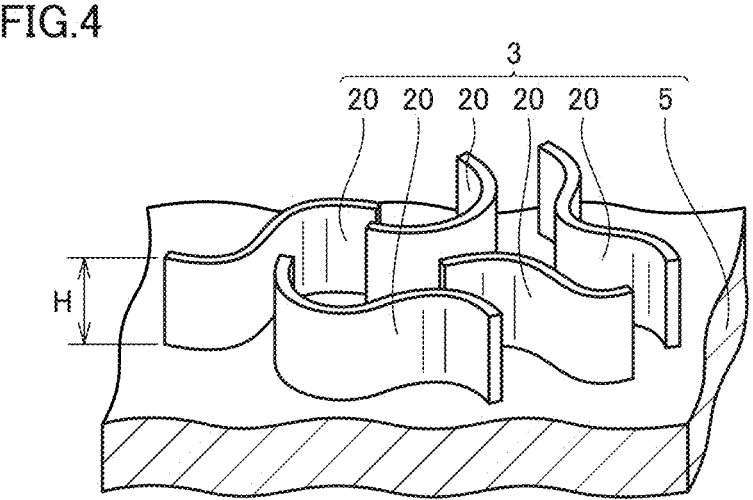
FIG. 4 is an enlarged schematic view showing another example of region III in FIG. 2.
Figure 5:
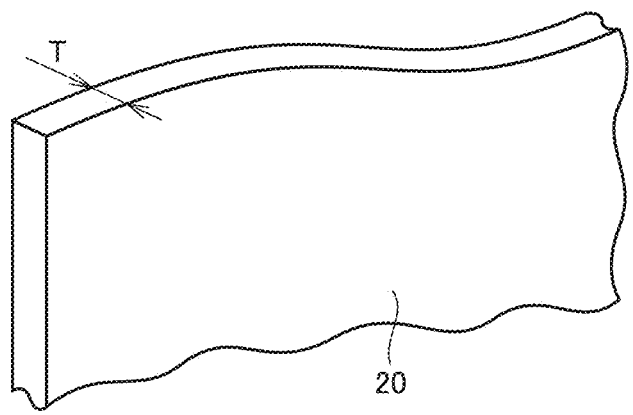
FIG. 5 is an enlarged schematic view showing a carbon nanowall shown in FIG. 4.

Porous member 1 includes base member 5 including the porous body, and carbon nanotubes 10 as one example of the carbon nanostructures formed on the surface of base member 5. Base member 5 has a three-dimensional network structure as shown in FIG. 2. From a different viewpoint, a network structure portion 3 including base member 5 and carbon nanotubes 10 formed on the surface of base member 5 has a three-dimensional network structure as shown in FIG. 2. Carbon nanotubes 10 are formed to the inside of the fine pores extending inwardly from the outermost surface of porous member 1. It is noted that, instead of carbon nanotubes 10 formed on the surface of base member 5, carbon nanowalls 20 (see FIGS. 4 and 5) as other carbon nanostructures may be formed. Alternatively, both carbon nanotubes 10 and carbon nanowalls 20 (see FIGS. 4 and 5) may be formed on the surface of base member 5. Further, as such carbon nanostructures formed on the surface of base member 5, microstructures having a width of less than or equal to 100 nm and constituted of carbon, such as graphite tables, may also be formed.

Here, carbon nanotube 10 refers to a structure in the form of a coaxial tube made of a single layer or multiple layers of graphene sheets constituted of carbon. Further, carbon nanowall 20 refers to a belt-like structure which protrudes from the surface of a base material (base member 5) and is made of a single layer or multiple layers of graphene sheets. Furthermore, from a different viewpoint, carbon nanowall 20 refers to a wall-like structure having a thickness T of less than or equal to 50 nm, a height H of more than or equal to 50 nm, and a length in a direction along the surface of base member 5 of more than or equal to 100 nm.

As base member 5, for example, a porous metal member can be used. As the metal member, any metal which can be formed as a thin film by an electroplating method, such as for example nickel (Ni), iron (Fe), a nickel-chromium (Ni—Cr) alloy, copper (Cu), silver (Ag), gold (Au), or aluminum (Al), can be applied as the material constituting base member 5. Further, examples of a metal material that can be used as a metal material constituting base member 5 include stainless steel, or a metal which can be powdered and contained in slurry so that the slurry can be applied on a porous body such as a sponge or a nonwoven fabric.

Furthermore, as the material for base member 5, for example, an inorganic material can also be used. As the inorganic material, for example, quartz glass ($SiO_2$) can be used. When quartz glass is used, base member 5 including quartz glass can be formed by a sol-gel method. In addition, as the material constituting base member 5, another multi-component glass (for example, $SiO_2$—$Al_2O_3$—$B_2O_5$ or the like) can be used. In this case, base member 5 including a multi-component glass can be formed, for example, by applying slurry containing a source material for the multi-component glass on a sponge, a nonwoven fabric, or the like and burning the same.

Further, as the material constituting base member 5, ceramics can also be used. As the ceramics, for example, single-component ceramics such as $Al_2O_3$, AlN, and SiC, or multi-component ceramics such as mullite ($Al_2O_3$—$SiO_2$) and cordierite (MgO—$Al_2O_3$—$SiO_2$) can be used. Also in this case, base member 5 can be fabricated by the sol-gel method or using slurry containing a source material, as with the glass material and the like described above.

Carbon nanotube 10, which is one example of the carbon nanostructure formed on the surface of base member 5, can have a diameter of for example, more than or equal to 0.34 nm and less than or equal to 100 nm. Carbon nanotube 10 can have a length of, for example, less than or equal to 10 µm. In addition, carbon nanowall 20 shown in FIGS. 4 and 5 can have thickness T of, for example, more than or equal to 0.34 nm and less than or equal to 15 nm. Carbon nanowall 20 can have height H of more than or equal to 60 nm and less than or equal to 7 µm. The distance between adjacent carbon nanowalls 20 can be set to, for example, more than or equal to 50 nm and less than or equal to 1000 nm.

In porous member 1 described above, the carbon nanostructures are further formed on the surface of base member 5 including the porous body, and thus the surface area thereof can be increased as compared to a simple porous body. As a result, a member having a significantly large surface area per unit volume can be obtained. Accordingly, when porous member 1 in accordance with the present invention is used as a support for a catalyst (for example, when a catalyst is arranged on the surfaces of the carbon nanostructures), the amount of the catalyst per unit volume can be increased, and a catalyst having a high performance can be implemented.

Further, by applying porous member 1 to a portion in contact with a refrigerant of a heat exchanger, efficiency of heat exchange with the refrigerant (heat medium) can be improved. Moreover, if porous member 1 described above is applied for example to a filter, finer irregularities are formed by the carbon nanostructures formed on the surface of base member 5, as compared to a case where a conventional porous body is used. Therefore, fine particles with a small diameter, which cannot be captured by a conventional filter, can be captured. As a result, dust can be captured more efficiently. In addition, since the surface area per unit volume of porous member 1 can be significantly increased, porous member 1 can also be applied to, for example, a material for an electrode of a battery which requires a large surface area.

(Method for Manufacturing Porous Member)

A method for manufacturing porous member 1 shown in FIGS. 1 to 5 will be described. First, a material preparation step (S10) is performed. Specifically, base member 5, which is a porous body, is prepared. As base member 5, for example, a porous body containing nickel may be prepared. It is noted that, as the material constituting base member 5, any other metal (for example, copper, gold, or the like), or an inorganic material such as glass, or ceramics can be used.

Further, as a method for manufacturing base member 5, methods as described below can be used. For example, a metal layer is formed on a surface of a porous body having communication pores (a foamed resin molded body). As a formation method, a liquid phase method such as electroplating and electroless plating, or a gas phase method such as an evaporation method, a sputtering method, and a CVD method can be used. Thereafter, there may be used such a method that heat treatment is performed on the porous body to dissolve the porous body, and further, when the metal layer subjected to the heat treatment is oxidized, reduction treatment is performed on the metal layer.

Furthermore, as the method for manufacturing base member 5, there can also be used such a method that slurry containing the material to constitute base member 5 (for example, metal or the like) is applied on the surface of the foamed resin molded body described above and heat treatment is performed to dissolve the molded body and form a film from the material in the slurry.

Next, nanoparticles serving as a catalyst for forming the carbon nanostructures (for example, carbon nanotubes 10) are arranged on the surface of base member 5. Examples of a material that can be used as a material for the nanoparticles include iron (Fe), nickel (Ni), cobalt (Co), and the like. These nanoparticles can be formed on the surface of base member 5 by any conventionally well-known method. For example, the nanoparticles can be formed using such a method that base member 5 is immersed in a solution in which metal nanoparticles serving as a catalyst are dispersed, and thereafter base member 5 is dried. It is noted that, when the material for base member 5 acts as a catalyst for forming the carbon nanostructures, it is not necessary to arrange the above nanoparticles. Further, when carbon nanowalls 20 are formed as the carbon nanostructures, it is not necessary to dispersedly arrange the metal nanoparticles on the surface of base member 5 as described above.

Next, the step of growing the carbon nanostructures (S20) is performed. In this step (S20), the carbon nanostructures (10, 20) can be formed by any method, and preferably, a chemical vapor deposition method (CVD method) can be used. Thus, porous member 1 shown in FIGS. 1 to 5 can be obtained.

(Properties of Porous Member)

Porous member 1 can have a porosity of for example, more than or equal to 50% and less than or equal to 98%. The porosity is preferably more than or equal to 80% and less than or equal to 98%, and more preferably more than or equal to 90% and less than or equal to 98% Further, for the pores in porous member 1, the number of pores per unit length (1 cm) can be arbitrarily adjusted in a range of, for example, more than or equal to two and less than or equal to 60, by adjusting the structure of the foamed resin molded body used to form base member 5. It is noted that the number of pores per unit length can be specified by setting straight lines having a unit length at any five locations on a sample surface of porous member 1, measuring the number of pores crossed by each straight line, and calculating an average value of the measured values.

Further, the pressure loss of porous member 1 can be less than or equal to 1000 Pa, when a measured wind speed is 2 m/s and the porous member as a sample has a thickness of 10 mm. The pressure loss is preferably less than or equal to 500 Pa, and more preferably less than or equal to 150 Pa. It is noted that the pressure loss can be measured by any conventionally well-known method, and for example, a method as described below can be used. First, the porous member as a sample is arranged within a measurement duct, and a U-tube manometer is arranged to be connected to the inside of the measurement duct on each of an upstream side and a downstream side of the porous member. In this state, a gas is passed from the upstream side into the measurement duct, and the pressure on the upstream side (inlet pressure) and the pressure on the downstream side (outlet pressure) of the porous member are measured by the above U-tube manometer. The pressure loss is expressed by an equation "inlet pressure (i.e., static pressure on the upstream side)—outlet pressure (i.e. static pressure on the downstream side)", and can be measured as a difference in the liquid level height of a liquid (water) in the above U tube manometer.

(Application Examples of Porous Member)

Figure 6:
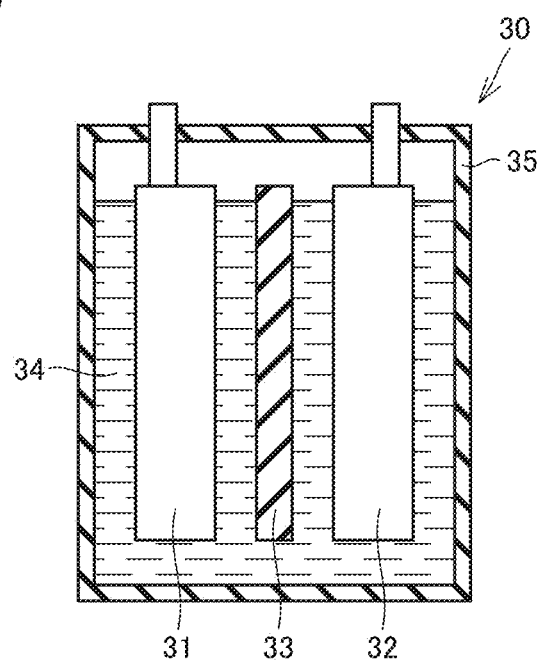
FIG. 6 is a schematic view showing a battery using the porous member in accordance with the present embodiment.

Referring to FIG. 6, a battery 30 using the porous member in accordance with the present embodiment mainly includes a positive electrode 31 constituted of porous member 1 in accordance with the present invention, a negative electrode 32, a separator 33, an electrolytic solution 34, and a container 35. Positive electrode 31 constituted of porous member 1 in accordance with the present embodiment described above is arranged inside container 35. Negative electrode 32 is arranged to face positive electrode 31. Separator 33 is arranged between positive electrode 31 and negative electrode 32. The inside of container 35 is filled with electrolytic solution 34. Terminals are connected to extend from positive electrode 31 and negative electrode 32 to the outside of container 35.

For positive electrode 31, metal can be used as base member 5. As the metal constituting base member 5, for example, aluminum or the like may be used. By applying porous member 1 in accordance with the present embodiment to positive electrode 31 as described above, the surface area per unit volume of positive electrode 31 can be increased. As a result, performance of the battery can be improved. It is noted that the structure of battery 30 is not limited to the structure shown in FIG. 6. For example, a laminate including positive electrode 31, separator 33, and negative electrode 32 wound like a coil may be arranged within container 35, or a plurality of laminates each including positive electrode 31, separator 33, and negative electrode 32 may be prepared and arranged within container 35.

Figure 7:
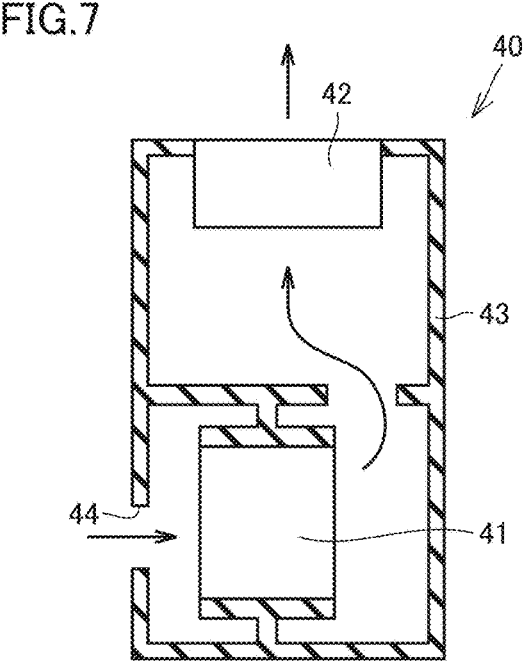
FIG. 7 is a schematic view showing a filtering device using the porous member in accordance with the present embodiment.

Referring to FIG. 7, a filtering device 40 using porous member 1 in accordance with the present embodiment as a filter will be described. Filtering device 40 is, for example, an oil mist collector or the like, in which a filter 41 to which porous member 1 in accordance with the present embodiment is applied is arranged within a case 43, and a fan 42 is installed on case 43. An opening 44 for introducing a gas to be filtered is formed at a portion of case 43 facing filter 41. In porous member 1 constituting filter 41, for example, metal such as stainless steel, a nickel-chromium alloy, or nickel can be used as the material for base member 5. When stainless steel is used as the material for base member 5, manufacturing cost of filter 41 can be relatively reduced, and heat resistance and oxidation resistance of filter 41 can be improved. Further, when a nickel-chromium alloy is used as the material for base member 5, the heat resistance of filter 41 can be improved, although the manufacturing cost becomes higher as compared to the case where stainless steel is used.

In filtering device 40, by operating fan 42, the gas to be filtered is introduced from opening 44 into case 43, as indicated by an arrow. When the gas passes through filter 41, the gas comes into contact with the surface of porous member 1 constituting filter 41 (surface on which the carbon nanostructures are formed), and thereby substances to be filtered contained in the gas (for example, oil, fine particles, and the like) can be captured at filter 41. After the substances to be filtered such as oil, fine particles, and the like are captured, the gas flows through case 43 as indicated by an arrow, and is emitted by fan 42 to the outside of case 43.

It is noted that, while filter 41 may be constituted of only porous member 1 in accordance with the present embodiment, another filter constituted of another nonwoven fabric or another member may be arranged on the upstream side of porous member 1 (on a side closer to opening 44).

With this structure, the capture rate of substances to be filtered smaller in size than conventional substances can be improved.

Figure 8:
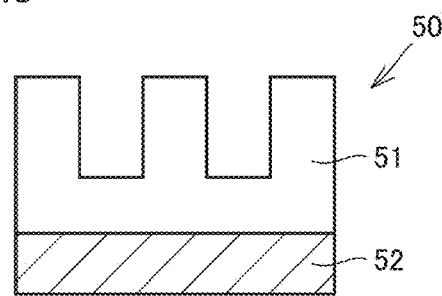
FIG. 8 is a schematic view showing a heat dissipating member using the porous member in accordance with the present embodiment.

Referring to FIG. 8, a heat dissipating member 50 to which porous member 1 in accordance with the present embodiment is applied will be described. Referring to FIG. 8, heat dissipating member 50 mainly includes a base body 52 including metal or the like, and a heat dissipator 51 connected to base body 52. Heat dissipator 51 is constituted of porous member 1 in accordance with the present embodiment described above. Further, a plurality of protruding fins are formed at a surface of heat dissipator 51. It is noted that the shape of heat dissipator 51 is not limited to the structure as shown in FIG. 8, and any other structure may be adopted therefor.

By using porous member 1 in accordance with the present embodiment for heat dissipator 51 as described above, the surface area of heat dissipator 51 can be increased, and thus the contact area between heat dissipator 51 and a cooling medium (for example, air, cooling water, or the like) which comes into contact with heat dissipator 51 can be increased. As a result, heat dissipation efficiency in heat dissipating member 50 can be further improved.

Figure 9:
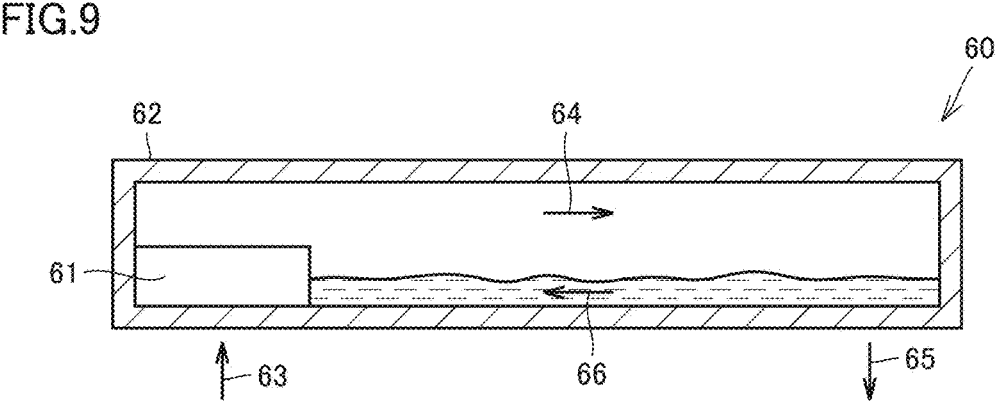
FIG. 9 is a schematic view showing a heat pipe using the porous member in accordance with the present embodiment.

Referring to FIG. 9, a heat pipe 60 to which porous member 1 in accordance with the present embodiment is applied will be described. Heat pipe 60 mainly includes a tubular case 62, an evaporator 61 arranged at one end of the inside of case 62, and a working liquid 67 enclosed within case 62. It is noted that the pressure inside case 62 is reduced until a substantially vacuum state is established. Porous member 1 in accordance with the present embodiment described above is applied to evaporator 61.

Next, operation of heat pipe 60 will be briefly described. In case 62, one end portion at which evaporator 61 is arranged is heated, and an end portion on the other side is cooled. As a result, at the heated one end portion (end portion at which evaporator 61 is arranged), working liquid 67 evaporates and vapor of the liquid is generated. The vapor flows inside case 62 as indicated by an arrow 64, is cooled at the other end portion of case 62, and thereby is condensed to liquid. Working liquid 67 condensed to liquid flows inside case 62 toward evaporator 61 as indicated by an arrow 66. As a result, when the one end portion of heat pipe 60 is heated as indicated by an arrow 63, heat is dissipated at the other end portion as indicated by an arrow 65, in association with condensation of vaporized working liquid 67 as indicated by arrow 65. Namely, by latent heat transfer in association with evaporation and condensation of working liquid 67 within case 62 of heat pipe 60, a large amount of heat is transferred from the side of the one end portion at which a heating portion (evaporator 61) is arranged to the side of a cooling portion (the side of the other end portion in case 62), using a small temperature difference at the both end portions of case 62.

In such a heat pipe 60, heat transfer properties as much as 100 times can be obtained, as compared to a case where, for example, heat conduction in a copper round bar of the same size is taken into consideration. It is noted that, in order to move working liquid 67 from the cooling portion toward the heating portion as indicated by arrow 66, there can be adopted such a configuration that, for example, a wire net (wig) is arranged inside case 62 from the cooling portion toward the heating portion, or a fine trench (groove) is formed in an inner wall of case 62 from the cooling portion toward the heating portion, to reflux working liquid 67 through capillary action caused by the surface tension of working liquid 67. Such a heat pipe is referred to as a so-called wig-type heat pipe.

It is noted that any other type can be used as the type of heat pipe 60. For example, there may be adopted a type referred to as a thermosiphon type in which a cooling portion is arranged above a heating portion in the vertical direction, that is, case 62 is arranged to stand in the vertical direction. In this case, gravity is used to move working liquid 67 from the cooling portion to the heating portion. Further, porous member 1 in accordance with the present embodiment may be adopted for a heating portion in a self-excited vibration-type heat pipe.

In this case, by applying porous member 1 in accordance with the present embodiment as evaporator 61, the contact area between working liquid 67 and evaporator 61 can be increased, and thus working liquid 67 can be evaporated more efficiently. As a result, the heat transfer properties of heat pipe 60 can be further improved.

It is noted that, as the material constituting base member 5 of porous member 1 used for heat dissipating member 50 and heat pipe 60 described above, a material having a high heat conductivity and an excellent chemical durability can be used, such as for example copper (Cu), silver (Ag), gold (Au), aluminum (Al), aluminum nitride (AlN), silicon carbide (SiC), or the like.

Example 1

As one example of the porous member in accordance with the present embodiment, a metal porous body having carbon nanostructures formed on a surface thereof was prototyped as described below. As a sample, a porous body made of nickel (Celmet (registered trademark) made of nickel) was prepared.

<Manufacturing Process>

In an electric furnace having a quartz reaction tube, a base member within the quartz reaction tube is heated to a predetermined temperature. Thereafter, while flowing an inert gas containing hydrocarbon as a source gas into the quartz reaction tube for a desired time, carbon nanotubes are formed, and then are naturally cooled.

A base member is heated to a desired temperature within a container of an inductive coupling-type plasma CVD device. Thereafter, hydrocarbon and gases such as an inert gas and hydrogen gas are supplied from a gas introducing portion into the container. Next, a high frequency of 13.56 MHz is supplied from a high frequency power source to electrodes within the container for a desired time, to form carbon nanowalls on the base member.

<Result>

Figure 10:
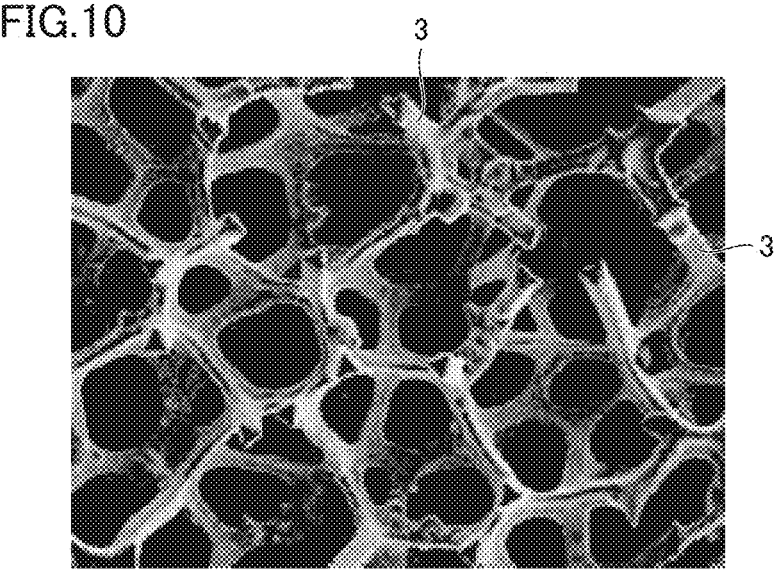
FIG. 10 is a scanning electron microscope photograph of one example of the porous member in accordance with the present embodiment.
Figure 11:
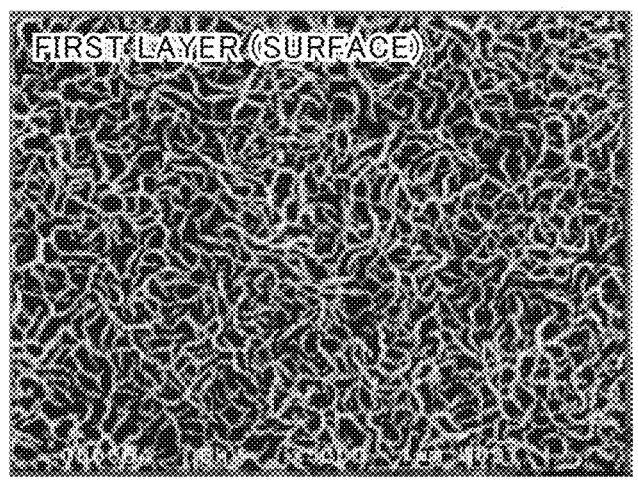
FIG. 11 is an enlarged photograph showing a portion of the porous member shown in FIG. 10.
Figure 12:
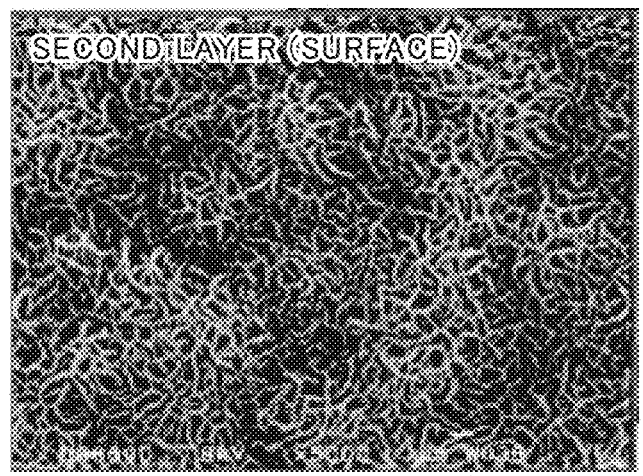
FIG. 12 is an enlarged photograph showing a portion of the porous member shown in FIG. 10.
Figure 13:
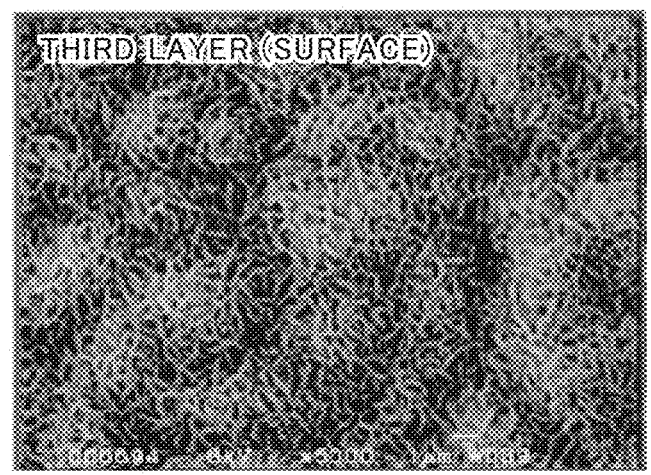
FIG. 13 is a scanning electron microscope photograph of a catalyst member in accordance with the present invention.
Figure 14:
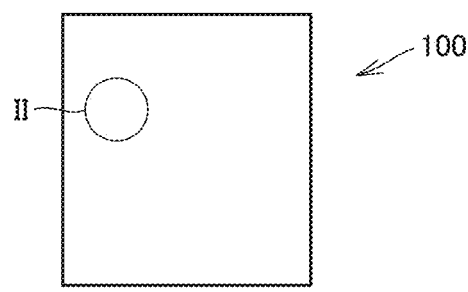
FIG. 14 is a schematic view showing a catalyst member in accordance with the present invention.

FIGS. 10 to 13 show scanning electron microscope photographs of the porous body obtained as described above, having the carbon nanowalls formed on the surface. FIG. 10 shows a portion of the surface of the porous body, with a magnification of 10. Further, FIG. 11 is an enlarged photograph showing a surface of network structure portion 3 located at the outermost surface (the first layer) of the porous body. The magnification in FIG. 11 is 5000. Further, FIGS. 12 and 13 are enlarged photographs showing network structure portions 3 located at the second layer and the third layer, respectively, from the outermost surface of the porous body. The magnification in FIGS. 12 and 13 is 5000.

As can be seen from the photographs shown in FIGS. 10 to 13, the carbon nanostructures are formed sufficiently at each of the first to third layers in network structure portion 3 of the porous body. In the porous body having the carbon nanostructures formed from a surface layer to the inside as described above, the surface area per unit volume can be sufficiently increased.

Second Embodiment

Figure 15:
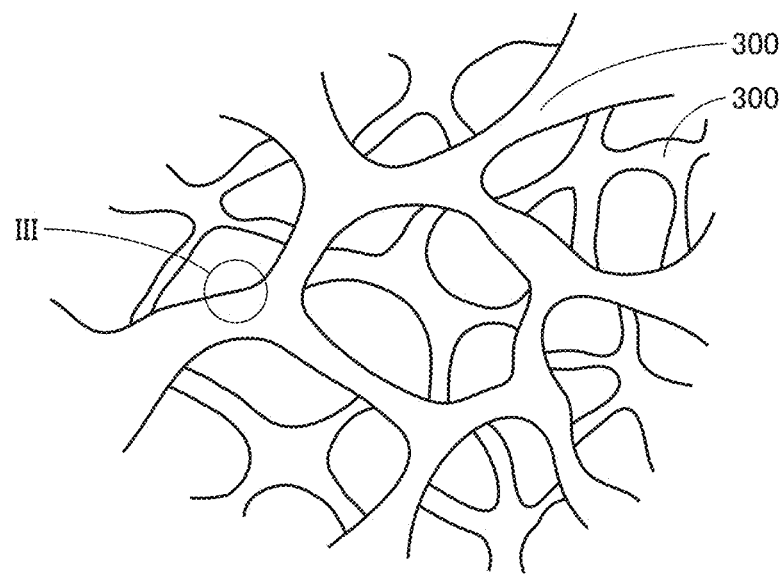
FIG. 15 is an enlarged schematic view showing a region II in FIG. 14.
Figure 16:
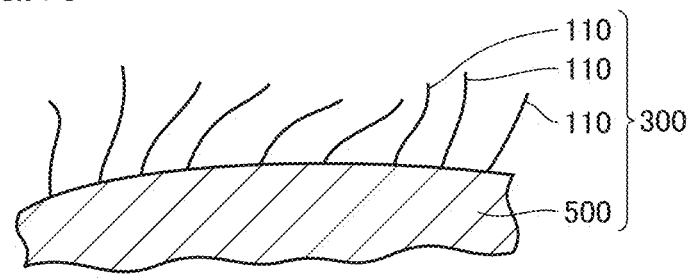
FIG. 16 is an enlarged schematic view showing a region III in FIG. 15.

Referring to FIGS. 14 to 17, a catalyst member 100 in accordance with the present invention will be described. For catalyst member 100 in accordance with the present invention, any shape such as a flat plate shape, a columnar shape, or a tubular shape can be adopted. Catalyst member 100 includes a base member 500 made of a porous body, carbon nanostructures 200 formed on a surface of base member 500, and a catalyst 220 arranged on surfaces of carbon nanostructures 200. Base member 500 has a network structure as shown in FIG. 15. From a different viewpoint, a network structure portion 300 including base member 500 and carbon nanostructures 200 having catalyst 220 formed on the surfaces thereof has a three-dimensional network structure as shown in FIG. 15. Examples of carbon nanostructures 200 include carbon nanotubes, carbon nanowalls, graphite tapes, and the like. Hereinafter, carbon nanostructure 200 having catalyst 200 formed on the surface thereof will be referred to as a catalyst-provided carbon nanostructure 110. Further, as base member 500, for example, a porous metal member can be used. Specifically, as base member 500, for example, a porous member made of nickel can be used.

With such a structure, since a plurality of fine pores are present in the surface of base member 500 made of the porous body and having the three-dimensional network structure (i.e., network structure portion 300) as shown in FIG. 15, the surface area per unit volume of base member 500 is significantly larger than that of a common bulk body. Accordingly, the number of catalyst-provided carbon nanostructures 110 formed per unit volume of base member 500 can also be increased, as compared to a case where catalyst-provided carbon nanostructures 110 are formed on a surface of the mere bulk body. Therefore, when catalyst 220 arranged on the surfaces of catalyst-provided carbon nanostructures 110 has a constant density, the density of catalyst 220 per unit volume of catalyst member 100 can be increased. As a result, high performance catalyst member 100 capable of causing a catalytic reaction with a high density can be implemented.

In catalyst member 100 described above, a plurality of fine pores may be formed in the surface of base member 500.

From a different viewpoint, base member 500 has a three-dimensional network structure, and the plurality of fine pores are formed in base member 500 to extend from the outermost surface toward the inside thereof in addition, in base member 500, catalyst-provided carbon nanostructures 110 are formed from the above surface to side walls of the fine pores located inside the surface. In this case, catalyst-provided carbon nanostructures 110 are formed to the inside of the fine pores extending to the inside of base member 500, and as a result, catalyst 220 arranged on the surfaces of carbon nanostructures 200 is also arranged to the inside of base member 500.

Figure 17:
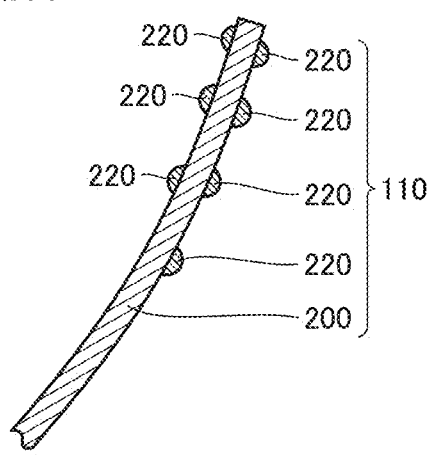
FIG. 17 is an enlarged schematic view of a carbon nanostructure shown in FIG. 16.

In catalyst member 100 described above, catalyst 220 is a particulate substance dispersedly arranged on the surface of carbon nanostructure 200, as shown in FIG. 17. In this case, catalyst 220 is arranged on the surface of fine carbon nanostructure 200 as a finer particulate substance. Therefore, the performance of catalyst member 100 can be improved in particular in the case of using catalyst 220 which advantageously acts on a catalytic reaction when it is dispersedly arranged in a small size.

Figure 18:
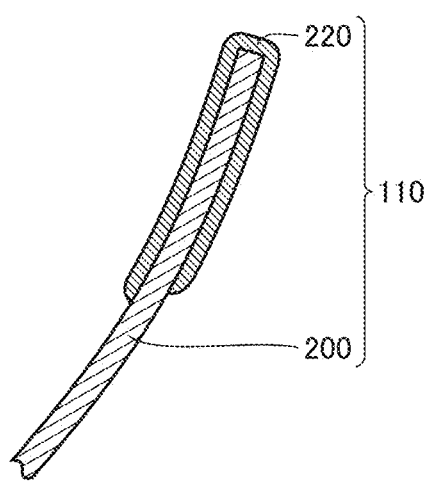
FIG. 18 is an enlarged schematic view showing a variation of the carbon nanostructure shown in FIG. 16.

In catalyst member 100 described above, catalyst 220 may be a film-like substance covering at least a portion of a side wall of carbon nanostructure 200, as shown in FIG. 18. In this case, the surface area of catalyst 220 can be increased, as compared to the case where catalyst 220 is arranged as a particulate substance on the surface of carbon nanostructure 200 as shown in FIG. 18. Therefore, the performance of catalyst member 100 can be improved in particular in the case of using catalyst 220 which advantageously acts on a catalytic reaction when it has a large surface area.

In catalyst member 100 described above, catalyst 220 may include at least one metal selected from the group consisting of platinum (Pt), gold (Au), vanadium (V), chromium (Cr), manganese (Mn), iron (Fe), cobalt (Co), nickel (Ni), copper (Cu), niobium (Nb), molybdenum (Mo), ruthenium (Ru), rhodium (Rh), palladium (Pd), silver (Ag), tantalum (Ta), tungsten (W), rhenium (Re), and iridium (Ir). These metals can act as a catalyst.

Next, a method for manufacturing the catalyst member shown in FIGS. 14 to 17 will be described. First, a material preparation step (S10) is performed. Specifically, base member 500, which is a porous body made of metal, is prepared. As base member 500, for example, a porous body made of nickel may be prepared. It is noted that, as a material constituting base member 500, any other metal (for example, copper, gold, or the like) can be used.

Next, nanoparticles serving as a catalyst for forming carbon nanostructures 200 are arranged on the surface of base member 500. Examples of a material that can be used as a material for the nanoparticles include iron (Fe), nickel (Ni), cobalt (Co), and the like. These nanoparticles can be formed on the surface of base member 500 by any conventionally well-known method. For example, the nanoparticles can be formed using such a method that base member 500 is immersed in a solution in which metal nanoparticles serving as a catalyst are dispersed, and thereafter base member 500 is dried. It is noted that, when the material for base member 500 acts as a catalyst for forming carbon nanostructures 200, it is not necessary to arrange the above nanoparticles. Further, when carbon nanowalls are formed as carbon nanostructures 200, it is not necessary to dispersedly arrange the metal nanoparticles on the surface of base member 500 as described above.

Next, the step of growing the carbon nanostructures (S20) is performed. In this step (S20), carbon nanostructures 200 can be formed by any method, and preferably, a chemical vapor deposition method (CVD method) can be used.

Next, the step of forming a catalyst is performed (S30). In this step (S30), catalyst 220 is formed on the surfaces of carbon nanostructures 200 by any method. For example, base member 500 having carbon nanostructures 200 formed on the surface thereof may be immersed in an electroless plating liquid containing a metal (for example, platinum or the like) serving as catalyst 220 to deposit the metal serving as catalyst 220 on the surfaces of carbon nanostructures 200. Alternatively, a gas of a metal complex containing a metal serving as catalyst 220 may be brought into contact with base member 500 having carbon nanostructures 200 formed thereon to adsorb the metal complex on the surfaces of carbon nanostructures 200, and thereafter, base member 500 having carbon nanostructures 200 formed thereon may be left in the atmosphere to form catalyst 220 made of the metal derived from the metal complex on the surfaces of carbon nanostructures 200. Thus, catalyst member 1 shown in FIGS. 14 to 18 can be obtained.

Example 2

A metal porous body having carbon nanostructures formed on a surface thereof, constituting the catalyst member in accordance with the present invention, was prototyped as described below.

<Sample>

A porous body made of nickel (Celmet (registered trademark) made of nickel) was prepared.

<Manufacturing Process>

A method for forming carbon nanotubes on the surface of the above porous body is performed as described below. First, in an electric furnace having a quartz reaction tube, a base member within the quartz reaction tube is heated to a predetermined temperature. Thereafter, while flowing an inert gas containing hydrocarbon as a source gas into the quartz reaction tube for a desired time, carbon nanotubes are formed, and then are naturally cooled.

A method for forming carbon nanowalls on the surface of the above porous body is performed as described below. First, a base member is heated to a desired temperature within a container of an inductive coupling-type plasma CVD device. Thereafter, hydrocarbon and gases such as an inert gas and hydrogen gas are supplied from a gas introducing portion into the container. Next, a high frequency of 13.56 MHz is supplied from a high frequency power source to electrodes within the container for a desired time, to form carbon nanowalls on the base member.

<Result>

Figure 19:
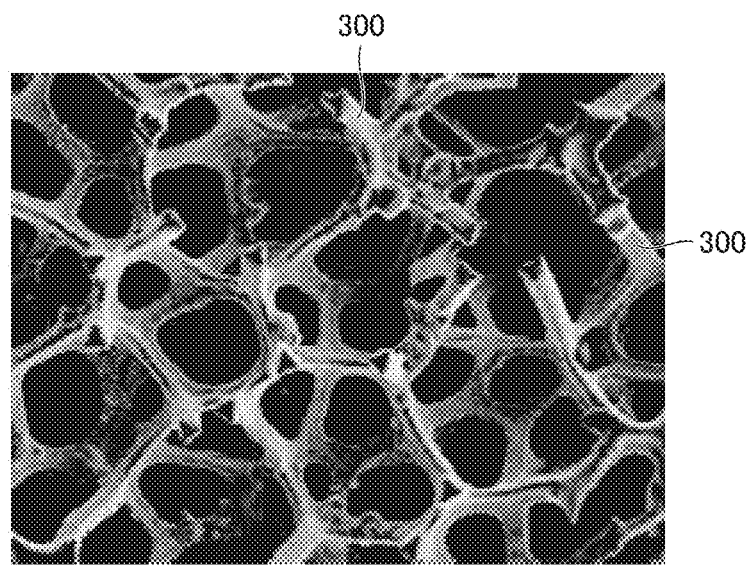
FIG. 19 is a scanning electron microscope photograph of the catalyst member in accordance with the present invention.
Figure 20:
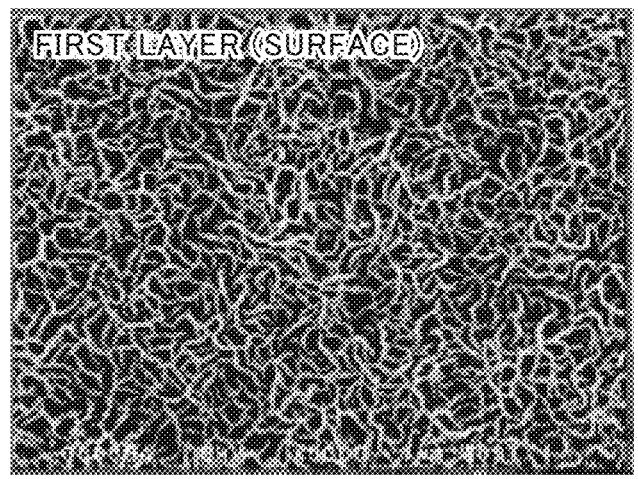
FIG. 20 is an enlarged photograph showing a portion of the catalyst member shown in FIG. 19.
Figure 21:
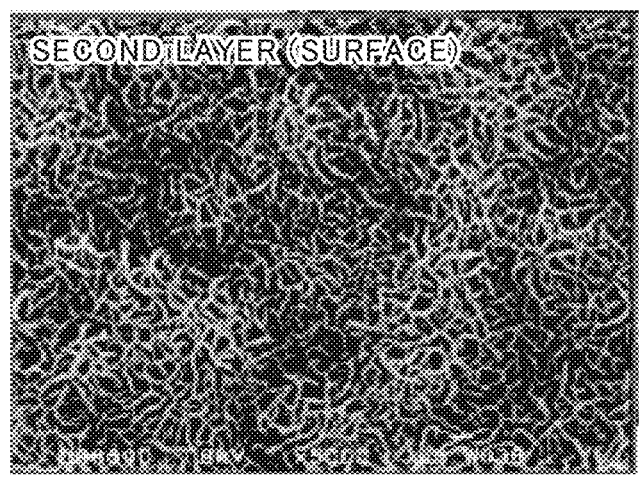
FIG. 21 is an enlarged photograph showing a portion of the catalyst member shown in FIG. 19.
Figure 22:
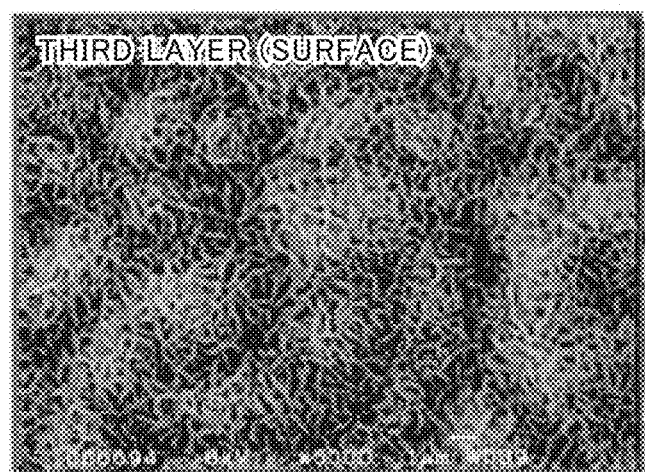
FIG. 22 is an enlarged photograph showing a portion of the catalyst member shown in FIG. 19.

FIGS. 19 to 22 show scanning electron microscope photographs of the porous body obtained as described above, having the carbon nanowalls formed on the surface. FIG. 19 shows a portion of the surface of the porous body, with a magnification of 10. Further, FIG. 20 is an enlarged photograph showing a surface of network structure portion 300 located at the outermost surface (the first layer) of the porous body. The magnification in FIG. 20 is 5000. Further, FIGS. 21 and 22 are enlarged photographs showing network structure portions 300 located at the second layer and the third layer, respectively, from the outermost surface of the porous body. The magnification in FIGS. 21 and 22 is 5000.

As can be seen from the photographs shown in FIGS. 19 to 22, the carbon nanostructures are formed sufficiently at each of the first to third layers in network structure portion 300 of the porous body. In the porous body having the carbon nanostructures formed from a surface layer to the inside as described above, a catalyst member with a high density of catalyst 220 can be easily obtained by arranging catalyst 220 on the surfaces of the carbon nanostructures as shown in FIG. 17 or FIG. 18.

It should be understood that the embodiments and examples disclosed herein are illustrative and non-restrictive in every respect. The scope of the present invention is defined by the scope of the claims, rather than the description above, and is intended to include any modifications within the scope and meaning equivalent to the scope of the claims.

INDUSTRIAL APPLICABILITY

The present invention is advantageously applicable to members required to have a large specific surface area such as a filter, a battery electrode, and a catalyst, and to high performance catalyst members having an increased catalyst density.

REFERENCE SIGNS LIST

1: porous member; 3, 300: network structure portion; 5, 500: base member; 10: carbon nanotube; 20: carbon nanowall; 30: battery; 31: positive electrode; 32: negative electrode; 33: separator; 34: electrolytic solution; 35: container; 40: filtering device; 41: filter; 42: fan; 43, 62: case; 44: opening; 50: heat dissipating member; 51: heat dissipator; 52: base body; 60: heat pipe; 61: evaporator; 63, 64, 65, 66: arrow; 67: working liquid; 100: catalyst member; 110: catalyst-provided carbon nanostructure; 200: carbon nanostructure; 220: catalyst.

The invention claimed is:

1. A porous member, comprising:
    a base member including a porous body having a porosity of more than or equal to 80%; and
    carbon nanostructures are formed on a surface of said base member and grown from said surface of said base member in a wall-like structure, said carbon nanostructures including a bottom surface parallel to said surface of said base member, said bottom surface having a lengthwise side and a widthwise side, wherein the widthwise side is less than or equal to 100 nm, and the lengthwise side is more than or equal to 100 nm.

2. The porous member according to claim 1, wherein
    a plurality of fine pores are formed in the surface of said base member, and
    in said base member, said carbon nanostructures are formed from said surface to side walls of said fine pores located inside said surface.

3. The porous member according to claim 1, wherein a material constituting said base member includes metal.

4. The porous member according to claim 1, wherein a material constituting said base member includes ceramics.

5. The porous member according to claim 1, wherein pressure loss when the porous member has a thickness of 10 mm and a measured wind velocity is 2 m/s is less than or equal to 1000 Pa.

6. A catalyst member, comprising a catalyst arranged on a surface of each of said carbon nanostructures of the porous member according to claim 1.

7. The catalyst member according to claim 6, wherein said catalyst is a particulate substance dispersedly arranged on the surface of each of said carbon nanostructures.

8. The catalyst member according to claim 6, wherein said catalyst is a film-like substance covering at least a portion of a side wall of each of said carbon nanostructures.

9. The catalyst member according to claim 6, wherein said catalyst includes at least one metal selected from the group consisting of platinum, gold, vanadium, chromium, manganese, iron, cobalt, nickel, copper, niobium, molybdenum, ruthenium, rhodium, palladium, silver, tantalum, tungsten, rhenium, and iridium.

\* \* \* \* \*